Nov. 15, 1938.   W. G. H. FINCH   2,136,789
TELEPICTURE ELECTRO-OPTICAL SYSTEM
Filed June 16, 1936    3 Sheets-Sheet 1

INVENTOR.
William G. H. Finch
BY
Samuel Ostrolenk
ATTORNEY.

Nov. 15, 1938.　　　W. G. H. FINCH　　　2,136,789
TELEPICTURE ELECTRO-OPTICAL SYSTEM
Filed June 16, 1936　　　3 Sheets-Sheet 2

INVENTOR.
William G. H. Finch
BY Samuel Ostrolenk
ATTORNEY.

Nov. 15, 1938.      W. G. H. FINCH      2,136,789
TELEPICTURE ELECTRO-OPTICAL SYSTEM
Filed June 16, 1936     3 Sheets-Sheet 3

INVENTOR.
William G. H. Finch
BY
Samuel Ostrolenk
ATTORNEY.

Patented Nov. 15, 1938

2,136,789

UNITED STATES PATENT OFFICE 2,136,789

TELEPICTURE ELECTRO-OPTICAL SYSTEM

William G. H. Finch, New York, N. Y.

Application June 16, 1936, Serial No. 85,482

3 Claims. (Cl. 178—7.1)

This invention relates to electro-optical systems particularly for telepicture transmitters, and is a continuation in part of my co-pending application Serial No. 84,426, filed June 10, 1936.

It is among the objects of this invention to provide novel means for readily adjusting the focus of a light source upon a picture to be transmitted; to provide novel means for ventilating the light source without permitting stray light to affect the scanning process. Another important feature of my present invention is to provide novel means for adjusting the lamp of the light source to a proper location and orientation within the optical system.

An intense source of light is required in telepicture apparatus and a great amount of heat is developed. The light source of prior systems caused the whole telepicture transmitter, at least the electro-optical portion of it, to become excessively heated. In accordance with my present invention, I contemplate the provision of a light source mounting which is substantially distinct from the body of the telepicture apparatus.

It is accordingly another object of this invention to provide a novel light source arrangement for a telepicture transmitter which eliminates heating within the body of the telepicture mechanism.

A further object is to provide a unitary structure for the light source housing which is readily demountable from the telepicture apparatus and which provides accessibility to the lamp for replacement.

These and other objects of my present invention will become apparent in the following description taken in connection with the drawings, in which.

Figure 2:
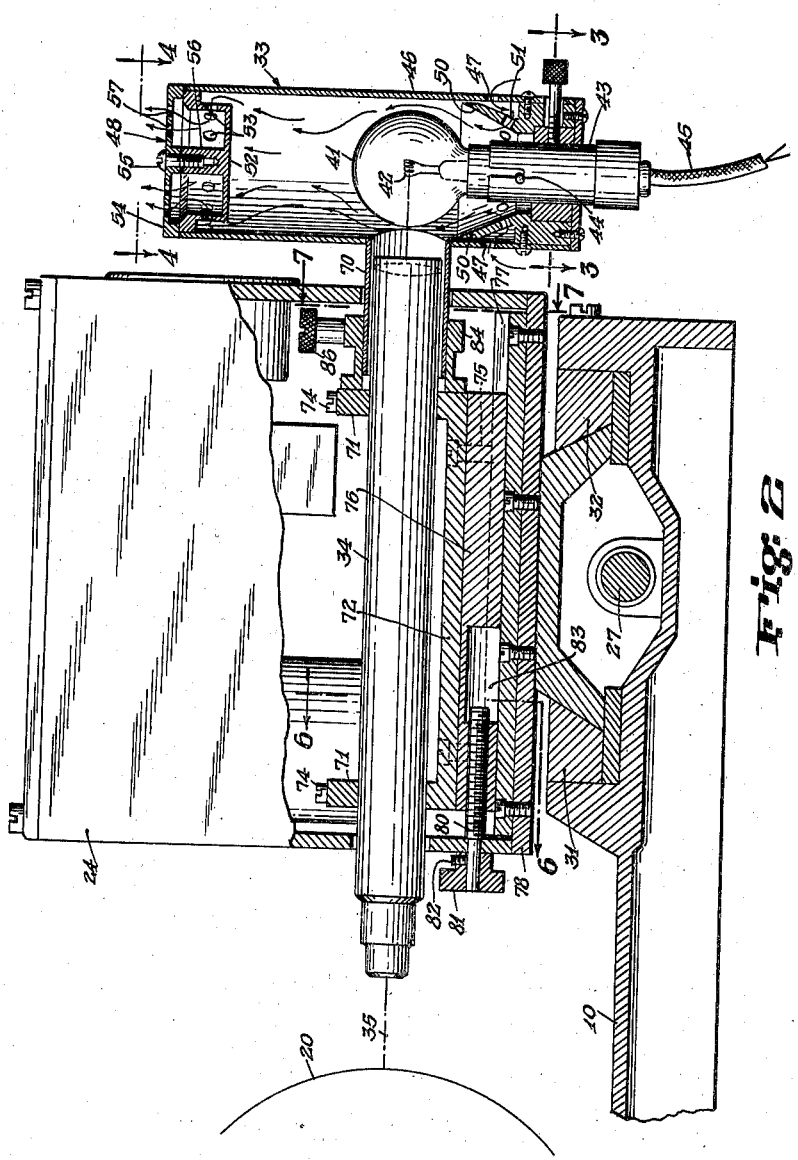
Figure 2 is a cross-sectional view taken along 2—2 of Figure 1 showing in detail the arrangement and construction of the electro-optical system.
Figure 4:
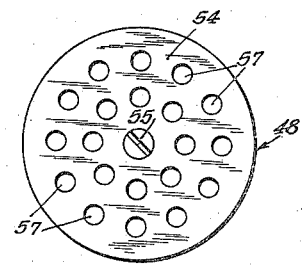

Figure 4 a plan view of the ventilation cover of the lamp housing as viewed from 4—4 of Figure 2.

Figure 1:
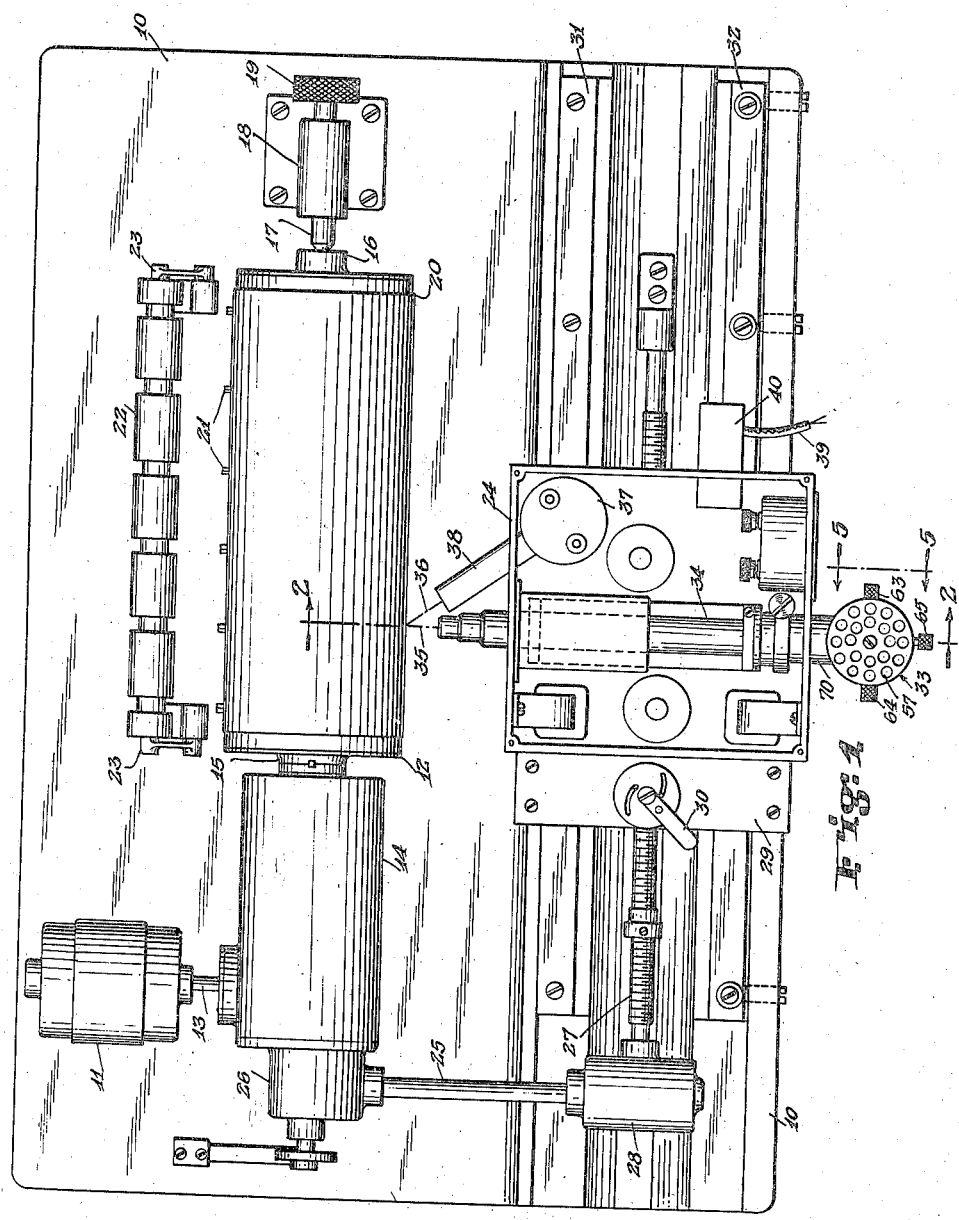
Figure 1 is a plan view of a telepicture transmitter embodying my present invention.
Figure 5:
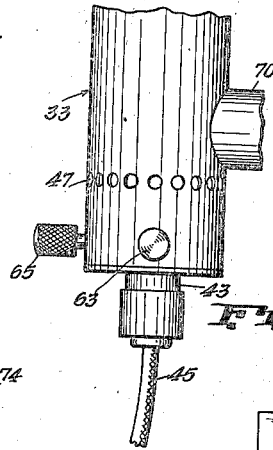

Figure 5 is a partial side elevation of the light source structure as viewed from 5—5 of Figure 1.

Figure 6:
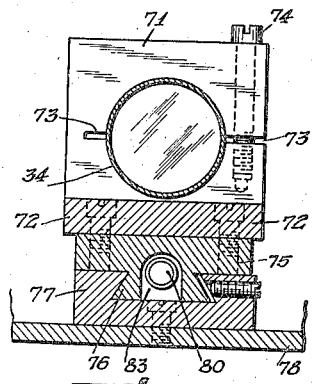

Figure 6 is a cross-sectional view taken along 6—6 of Figure 2 through the supporting structure of the lens focusing system.

Figure 7:
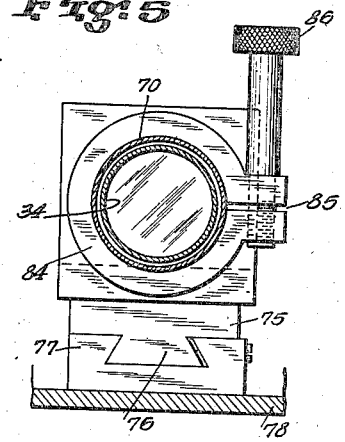

Figure 7 is a cross-sectional view taken along 7—7 of Figure 2 showing the clamping means for attaching the unitary light source structure to the telepicture carriage.

Figure 1 is a plan view of a telepicture transmitter, the operation of which is described in detail in my co-pending application Ser. No. 84,426, referred to above. The apparatus is mounted upon a cast iron base 10. A motor 11 drives the mechanism. The drum 12 is driven by motor 11 at a predetermined speed. The shaft 13 of motor 11 is connected to reduction gearing and a friction clutch located within housing 14 which is in turn connected to the end plate 15 of the drum 12.

The opposite end 16 of drum 12 is rotatably supported by pointed spindle 17 slidably supported in tail stock 18. A thumbscrew 19 is provided for manually moving spindle 17 against a spring biasing means within tail stock 18 for removing the picture drum 12. The picture 20 to be transmitted is secured upon drum 12 by a plurality of film clamping members 21 located on a section of the drum surface. A plurality of rubber surfaced rollers 22 supported in movable backets 23 are used to press against the sheet 20 to insure smooth mounting thereof.

The electro-optical scanning carriage 24 is moved parallel to the axis of the drum 12 and driven at a predetermined rate by extension drive shaft 25 suitably geared to the drum 12 drive. Details of preferred gearing arrangements located within the housing 14 and the housing extension 26 are described in detail in the application Ser. No. 84,426 supra. A worm drive shaft 27 is driven by the extension shaft 25 through a worm and worm gear enclosed within housing 28. A worm lock attached beneath extension plate 29 of carriage 24, coacts with the worm drive shaft 27 for moving carriage 24 as controlled by cam lever 30. A set of tracks 31—32 guide the carriage in a predetermined accurately parallel path with respect to the picture 20 mounted on the drum.

In a preferred embodiment, drum 12 is rotated at 100 revolutions per minute and carriage 24 is moved at the rate of 1″ per minute transversely of the drum. A scanning line width of .01 of an inch is used to continuously trace the picture 20 being transmitted in a manner well-known in the art.

A source of light contained within housing 33 attached to the rear end of transmitter carriage 24, is suitably focused through the focusing system 34 to a beam 35 impinging upon the picture sheet 20. The refracted beam 36 is focused upon a photoelectric cell enclosed in a light proof housing 37 through a focusing lens system 38.

The intensity of the refracted beam 36 varies in accordance with the elemental shading of the picture being scanned and correspondingly affects the photoelectric current, as will be understood by those skilled in the art. The electrical supply and signal output leads are connected to the movable carriage 24 through cable 39 detachable therefrom by a connection plug 40.

Figure 2 is a cross-sectional view through the optical system used in generating the light beam 35 and is taken along 2—2 of Figure 1. The source of light is preferably a lamp 41 having a small but intense light generating filament 42. A forty-watt automobile lamp is admirably suited as the lamp source 41. Lamp 41 is set in a receptacle base 42 and secured thereto by pin 44 coacting with a slot in the sleeve of the receptacle 43. A connection cable 45 electrically connects the lamp to a suitable source of current supply.

Casing 33 comprises a cylindrical body 46 having a series of ventilation holes 47 disposed near the bottom portion thereof, and containing a perforated lid 48 at the top. The ventilating structure of lamp casing 33 is designed to prevent the intense light from emanating therefrom to affect the light scanning operations on the picture 20. A conical partition 50 within the body 46 extends from the internal surface of the body 46 down to the smaller diameter lamp receptacle 43. A series of holes 51 are made in partition 50 at a level below that of the series of holes 47 in body 46. The purpose of the staggered relationship of the ventilating holes with respect to each other is to materially reduce the light from lamp 41 from shining out through the casing 33.

Lid 48 comprises a portion 52 projecting into the body of casing 33 and containing a series of ventilating holes 53 on a vertical plane. The bottom surface of member 52 is opaque. Hollow member 52 is attached to the top surface 54 of lid 48 by screw 55 threaded into a post 56, integral with member 52. A series of ventilating holes 57 are made in lid surface 54. Figure 4 is a plan view looking down on the top surface of the lid 48.

In Figure 2, as indicated by the arrows, the ventilation circuit is as follows: The external air enters the series of holes 57 and continues around the conical partition 50 through the holes 51 therein, passes up and around the lamp 41 to the lid 48, passes through the holes 53 into interior of lid 48 and out through the holes 57 in the top surface 54 of the lid. The heat from the bulb causes a rapid circulation of the air past it since the heat rises therefrom out through the lid 48 and the cool air rushes in through the holes 47 in the body of the lamp enclosure.

The light is practically all confined within the casing 33 except as directed in the beam 35 to the picture 20. The double light baffle at the intake and outlet of the airstream accomplishes this result.

Figure 3:
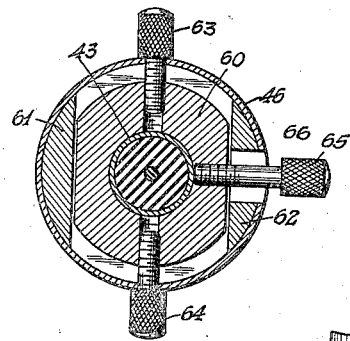
Figure 3 is a cross-sectional view taken along 3—3 of Figure 2 through the lamp adjusting mechanism.

Figure 3 is a cross-sectional view through the lamp position adjusting members. A collar 60 surrounds the lamp receptacle 43. Two opposite sides of the collar 60 are slotted in order to permit a sliding relationship between the members 61 and 62 attached to respective sides of the cylindrical body 46. The diameter of collar 60 is less than that of the body 46 so that a relative transverse movement of the collar 60 and therefore of the lamp 41 is possible. Two opposed thumb-screws 63 and 64 are attached to collar 60 in corresponding threaded portions thereof in the axis of the sliding moaement of collar 60 with respect to casing body 46 as guided by members 61 and 62. Manipulation of the thumb-screws 63 and 64 will determine the relative position of the collar 60 within the casing 46 as will be evident to those skilled in the art.

A further thumb-screw 65 operating in a threaded portion of collar 60 abuts the sleeve 43 of the lamp receptacle to first change the position within the collar 60. A slotted opening 66 is made in the member 62 and casing body 46 to permit transverse movement of the thumb-screw 65.

The position of the filament of lamp 41 is adjusted in the following manner: The vertical height of filament 42 is raised to the axis of the focusing system 34 by releasing set screw 65 and manually setting the height of the filament 42. The drum 12 is removed from the apparatus and a sheet of paper is placed at a distance from the front portion 67 of the focusing system 34, upon which the image of the lighted filament 42 is projected. The plane of the filament 42 is preferably placed perpendicular to the optical axis of lens system 34. However, the vertical height and the angular position of the lamp 41 is adjusted until a maximum filament area is projected upon the test sheet. The greater the area of the projected filament, the greater the intensity of the light beam 35 concentrated upon the picture sheet 20. When the best position of lamp 41 is determined, the set screw 65 is tightened to hold it in place in collar 60. Further manipulation of the thumb-screws 63 and 64 produces the optimum setting for the filament 42 as the light beam 35 generator.

Figure 5 is an elevation of the lamp casing 33 showing the disposititon of the ventilating holes 47. The lamp casing is a unitary structure embodying means for accurately adjusting the optimum position of the lamp filament with respect to the light beam, provides adequate ventilation for a heated lamp generator, and is practically detached from the body of the telepicture structure to prevent heating thereof. A tube 70 projects from the side of the casing 33 coaxial with the optical axis of the focusing system 34.

The lens system 34 concentrates the light from the filament 42 to a beam 35 of predetermined diameter. In the preferred embodiment, the diameter of the light beam 35 is made .01 of an inch. The lens system 34 is enclosed in a tubular casing which is adjustably supported within the carriage 24 with respect to the drum containing the record sheet 20. Lens system 34 is fastened in members 71—71 projecting from an adjustable base 72.

Figure 6 is a cross-sectional view taken along 6—6 of Figure 2 illustrating the supporting structure for the focusing system 34. The upright members 71 contain a slotted portion 73 through which a screw member 74 passes. The uprights 71 accordingly fasten lens system 34 rigidly when the screw members 74 are tightened. The base 72 is attached to a slidable bed 75 containing a dove-tail projection 76 coacting with a corresponding groove in a base 77 attached to the base 78 of the carriage 24.

The axial position of the lens system 34 is adjustable by means of the adjusting screw 80 manipulated through thumb-screw 81 attached thereto by set screw 82. Adjusting screw 80 passes through a threaded portion in the slidable bed 75 and is rotatably fixed in place in the wall of the carriage 24. The end of screw 80 projects into a recess 83. Rotation of the adjusting screw 80 will accordingly permit corresponding vernier axial adjustment of the focusing system 34 with respect to the filament 42 as will now be evident to those skilled in the art.

The unitary lamp structure 33 is mounted with respect to the lens system 34 by the projecting tube 70. As shown in Figure 2, tube 70 is concentric over the corresponding end of the lens system 34 and projects through a hole in a ring 84. Figure 7 is a cross-sectional view through the mounting means for the receptacle for the tubular extension 70 of the receptacle 33. Ring 84 contains a slit 85 at one side through which a fastened screw 86 projects for tightening into position the tubular extension 70 to rigidly hold the unitary lamp structure 33 in position. The removal of the unitary structure 33 from its clamped position on ring 84 is necessary when replacement or examination of the lamp 41 is desired or ready inspection of the casing 33 is required. However, lamp 41 may also be removed with casing 33 in position on carriage 24 by the removal of the lid 48.

The adjustment of the lamp filament 42 to produce a sharp beam 35, .01 of an inch in diameter, is made by means of the thumbscrews 63, 64 and 65 in the base of the lamp casing 33. The proper axial position of the focusing system 34 to accurately focus beam 35 upon the record sheet 20 is made by the micrometer adjustment screw 80 in a manner already described.

Although I have illustrated a preferred embodiment of my invention, it will be evident that modifications which come within the broader spirit and scope thereof are feasible, and I do not intend to be limited except as set forth in the following claims.

I claim:

1. The combination with a telepicture scanner housing a tubular lens system for focusing light rays upon a picture, and a photoelectric cell for receiving light refracted from the picture, of a separable, heatable source of light unit adapted to be adjustably attached to an end of said tubular lens system and external of said scanner whereby heat transfer between said heatable light unit and photoelectric cell is minimized.

2. The combination with a telepicture scanner housing a tubular lens system for focusing light rays upon a picture, and a photoelectric cell for receiving light refracted from the picture, of a separable, heatable source of light unit adapted to be adjustably attached to an end of said tubular lens system and external of said scanner, comprising an enclosure for a lamp, a tube extending from an opening in said enclosure and adapted to slide over said end of said tubular lens system, whereby heat transfer between said lamp and photoelectric cell is minimized.

3. The combination with a carriage housing a tubular lens system for focusing light rays upon a picture, and a photoelectric cell for receiving light refracted from the picture, of a separable, heatable source of light unit adapted to be adjustably attached to an end of said tubular lens system and external of said carriage, comprising an enclosure for a lamp, a tube extending from an opening in said enclosure and adapted to slide over said end of said tubular lens system, and means for fastening said tube into position on said lens system whereby heat transfer between said lamp and photoelectric cell is minimized.

WILLIAM G. H. FINCH.